United States Patent
Huang et al.

(10) Patent No.: US 9,171,021 B2
(45) Date of Patent: Oct. 27, 2015

(54) METHOD AND SYSTEM FOR CONFIGURING STORAGE DEVICE IN HYBRID STORAGE ENVIRONMENT

(71) Applicant: Huawei Technologies Co., Ltd., Shenzhen, Guangdong (CN)

(72) Inventors: Wenlong Huang, Beijing (CN); Haibin Wei, Hangzhou (CN); Shishi Shan, Hangzhou (CN); Kun Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/225,205

(22) Filed: Mar. 25, 2014

(65) Prior Publication Data

US 2014/0207827 A1 Jul. 24, 2014

Related U.S. Application Data

(63) Continuation of application No. PCT/CN2011/080451, filed on Sep. 30, 2011.

(51) Int. Cl.
*G06F 17/30* (2006.01)
*G06F 7/00* (2006.01)
*G06F 3/06* (2006.01)

(52) U.S. Cl.
CPC .......... *G06F 17/30289* (2013.01); *G06F 3/061* (2013.01); *G06F 3/0625* (2013.01); *G06F 3/0632* (2013.01); *G06F 3/0685* (2013.01); *Y02B 60/1246* (2013.01)

(58) Field of Classification Search
CPC . G06F 17/30289; G06F 3/061; G06F 3/0625; G06F 3/0632; G06F 3/0685
See application file for complete search history.

(56) References Cited

U.S. PATENT DOCUMENTS

| | | | |
|---|---|---|---|
| 5,442,765 A | 8/1995 | Shiga | |
| 5,761,395 A | 6/1998 | Miyazaki et al. | |
| 6,751,600 B1 * | 6/2004 | Wolin | 706/12 |
| 6,801,992 B2 * | 10/2004 | Gajjar et al. | 711/173 |
| 7,062,628 B2 * | 6/2006 | Amano | 711/170 |
| 7,065,616 B2 * | 6/2006 | Gajjar et al. | 711/154 |
| 8,656,454 B2 * | 2/2014 | Gunawardena et al. | 726/1 |
| 8,732,148 B2 * | 5/2014 | Jensen et al. | 707/705 |

(Continued)

FOREIGN PATENT DOCUMENTS

| | | |
|---|---|---|
| CN | 1117612 A | 2/1996 |
| CN | 1653422 A | 8/2005 |

(Continued)

*Primary Examiner* — Jeffrey A Burke

(57) ABSTRACT

The present invention provides a method and a system for configuring a storage device in a hybrid storage environment. The method includes: acquiring a plurality of attribute parameters of each storage device; performing calculation according to the attribute parameters to obtain a priority of each storage device; acquiring a storage priority of each data object; and performing matching according to the storage priority of each data object and the priority of each storage device, so as to store each data object into a storage device with a priority corresponding to the storage priority of the data object. Accordingly, configuration of a plurality of storage devices and a plurality of data objects in a hybrid storage environment can be implemented, which avoids manual involvement, thereby reducing security risks, improving performance of the system, and reducing energy consumption of the system.

14 Claims, 4 Drawing Sheets

(56) References Cited

U.S. PATENT DOCUMENTS

| | | |
|---|---|---|
| 2003/0225801 A1 | 12/2003 | Devarakonda et al. |
| 2005/0268041 A1 | 12/2005 | Yoshioka |
| 2008/0126716 A1 | 5/2008 | Daniels |
| 2008/0301255 A1* | 12/2008 | He et al. .................. 709/214 |
| 2009/0043831 A1* | 2/2009 | Antonopoulos et al. ...... 707/205 |
| 2009/0132621 A1* | 5/2009 | Jensen et al. .................. 707/205 |
| 2009/0228669 A1 | 9/2009 | Slesarev et al. |
| 2010/0037017 A1 | 2/2010 | Ryu et al. |
| 2013/0054677 A1* | 2/2013 | Ponsford et al. .............. 709/203 |

FOREIGN PATENT DOCUMENTS

| | | |
|---|---|---|
| CN | 1783316 A | 6/2006 |
| CN | 1945521 A | 4/2007 |
| CN | 101174245 A | 5/2008 |
| CN | 101819459 A | 9/2010 |
| CN | 101907978 A | 12/2010 |
| CN | 102200936 A | 9/2011 |

* cited by examiner

METHOD AND SYSTEM FOR CONFIGURING STORAGE DEVICE IN HYBRID STORAGE ENVIRONMENT

CROSS-REFERENCE TO RELATED APPLICATIONS

This application is a continuation of International Application No. PCT/CN2011/080451, filed on Sep. 30, 2011, which is hereby incorporated by reference in its entirety.

TECHNICAL FIELD

Embodiments of the present invention relate to the field of data storage, and in particular, to a method and a system for configuring a storage device in a hybrid storage environment.

BACKGROUND

With the rapid development of computer technologies, a computer storage system also goes through great changes, and a new type of storage device, such as an Solid-State Drive (SSD) and a Phase Change Memory (PCM), and a conventional disk storage device constitute a hybrid storage environment.

Compared with the conventional disk storage device, the new type of storage device, such as the SSD and PCM, is more advantageous in performance, density, and energy consumption, but is disadvantageous in cost and capacity. A plurality of types of storage devices is expected to coexist in a long time to come, and hybrid storage will become a mainstream storage configuration. FIG. 1 is a schematic diagram of an existing hybrid storage environment.

In addition, with the rapid development of network technologies, a network storage device and a local storage device combine to constitute a persistent storage system. With the increase of network bandwidths and in consideration of factors such as security and building cost of equipment rooms, in some cases, a network storage device is advantageous over a local storage device in becoming a persistent main storage device, and a local storage device is likely to serve as a temporary data buffer device or a standby device. In addition, competition among a plurality of storage service providers may make it necessary for a computer system to make a selection from a plurality of network storage devices.

A plurality types of database objects such as a table, an index and a log exists in a database system of a computer. These database objects have different demands in access frequency and capacity. In addition, most database systems provide storage settings for these database objects. However, in a hybrid storage environment, a solution is required to optimize a configuration of a storage device in terms of database objects.

SUMMARY

The present invention is proposed based on the foregoing objective, and an objective of the present invention is to provide a method and a system for configuring a storage device in a hybrid storage environment.

According to one aspect, a method for configuring a storage device in a hybrid storage environment is provided, including: acquiring a plurality of attribute parameters of each storage device in a plurality of storage devices; performing calculation according to the attribute parameters to obtain a priority of each storage device; acquiring a storage priority of each data object; and performing matching according to the storage priority of each data object and the priority of each storage device, so as to store each data object into a storage device with a priority corresponding to the storage priority of the data object.

According to another aspect, a system for configuring a storage device in a hybrid storage environment is provided, including: a device parameter acquisition apparatus, configured to acquire a plurality of attribute parameters of each storage device in a plurality of storage devices; a device priority calculation apparatus, connected to the device parameter acquisition apparatus, and configured to perform calculation according to the attribute parameters to obtain a priority of each storage device; an object priority acquisition apparatus, configured to acquire a storage priority of each data object; and a matching apparatus, connected to the device priority calculation apparatus and the object priority acquisition apparatus, and configured to perform matching according to the storage priority of each data object and the priority of each storage device, so as to store each data object into a storage device with a priority corresponding to the storage priority of the data object.

According to still another aspect, a distributed system for configuring a storage device in a hybrid storage environment is provided, including: a plurality of agents, each of which includes: a device parameter acquisition apparatus, configured to acquire a plurality of attribute parameters of each storage device in a plurality of storage devices; and a centralized configuration server, including a device priority calculation apparatus, connected to each device parameter acquisition apparatus of each agent, and configured to perform calculation according to the attribute parameters to obtain a priority of each storage device; an object priority acquisition apparatus, configured to acquire a storage priority of each data object; and a matching apparatus, connected to the device priority calculation apparatus and the object priority acquisition apparatus, and configured to perform matching according to the storage priority of each data object and the priority of each storage device, so as to store each data object into a storage device with a priority corresponding to the storage priority of the data object. Each agent further includes: a configuration information generation apparatus, connected to the matching apparatus, and configured to generate storage device configuration information of each data object; and a data object storage apparatus, connected to the configuration information generation apparatus, and configured to write the storage device configuration information of each data object into a configuration file of the data object, so as to store the data object into a storage device configured for the data object.

By using the foregoing method and system for configuring a storage device in a hybrid storage environment, automatic configuration of a plurality of storage devices and a plurality of data objects in a hybrid storage environment can be implemented, which avoids manual involvement, thereby reducing security risks, improving performance of the system, and reducing energy consumption of the system.

BRIEF DESCRIPTION OF THE DRAWINGS

To describe the technical solutions according to the embodiments of the present invention more clearly, the accompanying drawings for describing the embodiments or the prior art are introduced briefly in the following. Apparently, the accompanying drawings in the following description are only some embodiments of the present invention, and a person of ordinary skill in the art can derive other drawings from the accompanying drawings without creative efforts.

DETAILED DESCRIPTION

Figure 1:
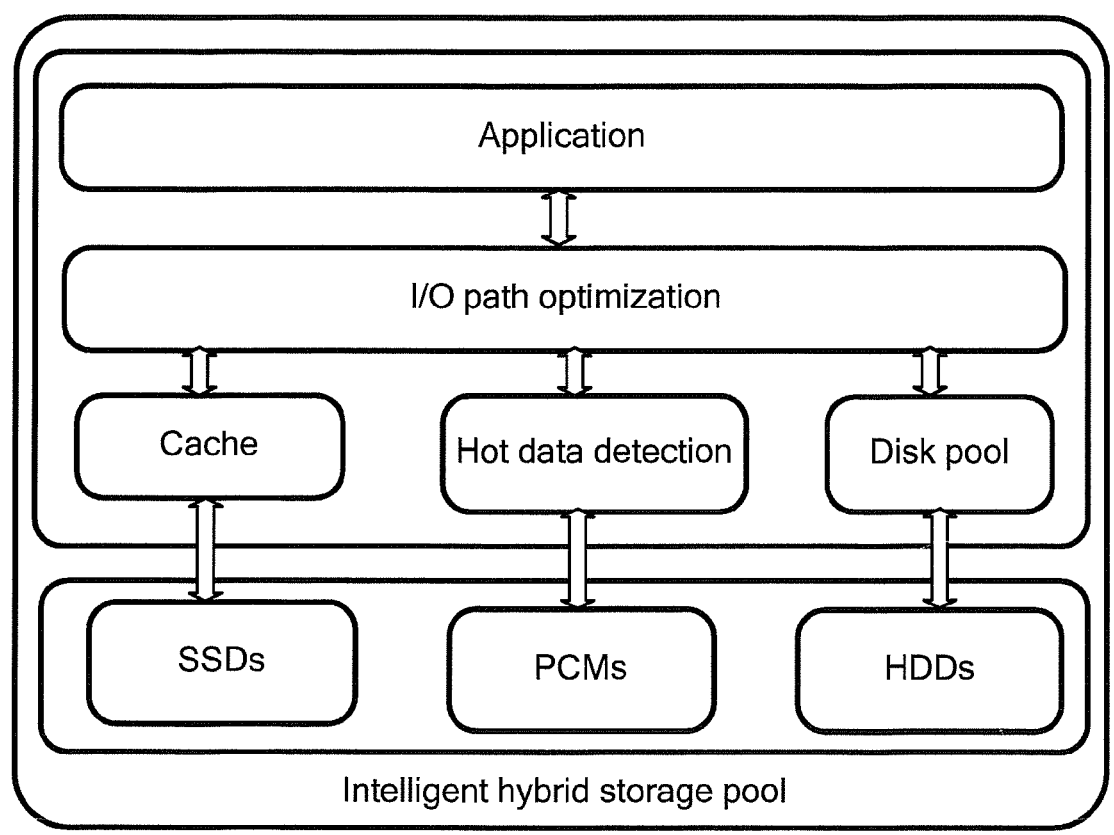
FIG. 1 is a schematic diagram of an existing hybrid storage environment.

The technical solutions according to the embodiments of the present invention will be clearly described in the following with reference to the accompanying drawings. It is obvious that the embodiments to be described are only a part rather than all of the embodiments of the present invention. All other embodiments obtained by a person of ordinary skill in the art based on the embodiments of the present invention without creative efforts shall fall within the protection scope of the present invention.

In the hybrid storage environment, for a plurality of database objects in a database system, it is required to set and adjust configurations for the database objects according to factors of storage devices, such as access latency, cost, capacity, and energy consumption, which is an important work and significantly affects aspects such as performance, cost, and energy consumption of the entire system.

Currently, in a hybrid storage environment, a database administrator (DBA) manually configures storage devices of a plurality of database objects in a database system, which is performed in the following manner:

First, the DBA needs to know how many types of storage device exist in the hybrid storage environment, and obtain capacity, read and write latencies, energy consumption and other information of these storage devices.

In addition, the DBA determines, according to access characteristics of different database objects in the database system, which storage devices place these database objects, and modifies a corresponding configuration of the database system.

In a data center, when database systems exists on a plurality of physical servers, the DBA needs to configure storage devices for database objects in the database systems on these servers separately.

For the solution in which a DBA manually configures storage devices of a plurality of database objects in a database system, many problems exist.

For example, security risks exist. The DBA needs administrator rights to access related information of the storage devices, which may cause potential security threats.

In addition, necessary information may fail to be acquired. During manual configuration, the DBA needs to know the type, access latency, capacity and other information of a storage device to determine a configuration policy. However, particularly, for access latency, a method for manually accessing the information is not provided in many operating systems, so that the DBA cannot optimize a configuration.

Furthermore, such manual configuration has a high requirement on skills of a system maintenance engineer. When configuring storage device options, the DBA needs to combine access frequencies and capacity requirements of database objects, such as an index, a log, a temporary table, and an ordinary table, and information of storage devices, such as a type, an access latency, and a capacity, to optimize the configuration policy, which has a high requirement on skills of a configuration person and results in a high cost of system maintenance. Further, different system maintenance engineers configure a storage device according to their own habits rather than a unified standard, which causes inconvenience.

Moreover, a large amount of work is involved in manual configuration, and in a future cloud computing environment, a DBA will need to manage more machines and more types of operating systems and database systems in a data center, which will greatly increase the amount of work in manually optimizing configurations for storage options, resulting in an excessively large amount of maintenance work.

In view of the foregoing problems of the manual configuration by a DBA, an embodiment of the present invention provides a method for configuring a storage device in a hybrid storage environment, where the method includes: obtaining a plurality of attribute parameters of each storage device in a plurality of storage devices; performing calculation according to the attribute parameters to obtain a priority of each storage device; acquiring a storage priority of each data object; and performing matching according to the storage priority of each data object and the priority of each storage device, so as to store each data object into a storage device with a priority corresponding to the storage priority of the data object.

In the method, after the storage priority of each data object and the priority of each storage device are configured, storage device configuration information of each data object may be further written into a configuration file of the data object, so as to store the data object into a corresponding storage device. For example, in a case in which the data object is a database object, the foregoing generated configuration information is written into configuration files of database systems of various types, so as to implement automatic storage of the database object.

In the method, attribute parameters such as a type, a capacity, and read and write latencies of each storage device in different operating systems may be acquired, a priority of each storage device may be generated according to the attribute parameters, and matching may be performed according to the priorities of the storage devices and priorities of data objects, so as to obtain storage device configuration information of the data objects.

Figure 2:
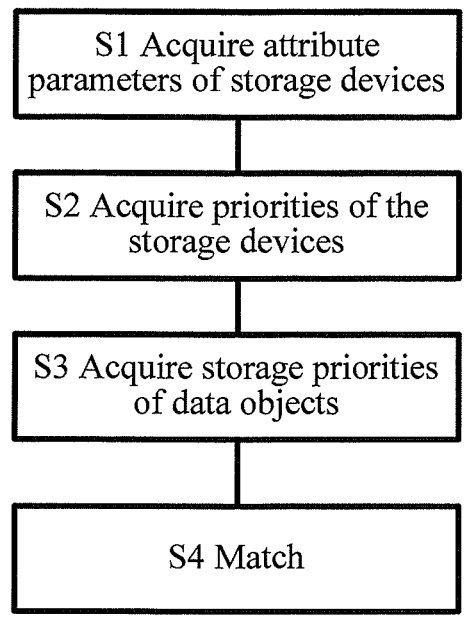
FIG. 2 is a schematic flowchart of a method for configuring a storage device in a hybrid storage environment according to an embodiment of the present invention.

FIG. 2 is a schematic flowchart of a method for configuring a storage device in a hybrid storage environment according to an embodiment of the present invention. As shown in FIG. 2, the method for configuring a storage device in a hybrid storage environment according to the embodiment of the present invention includes: S1: Acquire a plurality of attribute parameters of each storage device in a plurality of storage devices. S2: Perform calculation according to the attribute parameters to obtain a priority of each storage device. S3: Acquire a storage priority of each data object. S4: Perform matching according to the storage priority of each data object and the priority of each storage device, so as to store each data object into a storage device with a priority corresponding to the storage priority of the data object.

By using the foregoing method for configuring a storage device in a hybrid storage environment, automatic configuration of a plurality of storage devices and a plurality of data objects in a hybrid storage environment can be implemented, which avoids manual involvement, thereby reducing security risks, improving performance of a system, and reducing energy consumption of the system.

In addition, an embodiment of the present invention provides a system for configuring a storage device in a hybrid storage environment, where the system includes: a device parameter acquisition apparatus, configured to acquire a plurality of attribute parameters of each storage device in a plurality of storage devices; a device priority calculation apparatus, connected to the device parameter acquisition apparatus, and configured to perform calculation according to the attribute parameters to obtain a priority of each storage device; an object priority acquisition apparatus, configured to acquire a storage priority of each data object; and a matching apparatus, connected to the device priority calculation apparatus and the object priority acquisition apparatus, and configured to perform matching according to the storage priority of each data object and the priority of each storage device, so as to store each data object into a storage device with a priority corresponding to the storage priority of the data object.

In the system, when the storage priority of each data object and the priority of each storage device are configured, storage device configuration information of each data object is generated, and by the way of further writing the storage device configuration information of the data object into a configuration file of the data object, the data object can be stored into a storage device configured for the data object.

Figure 3:
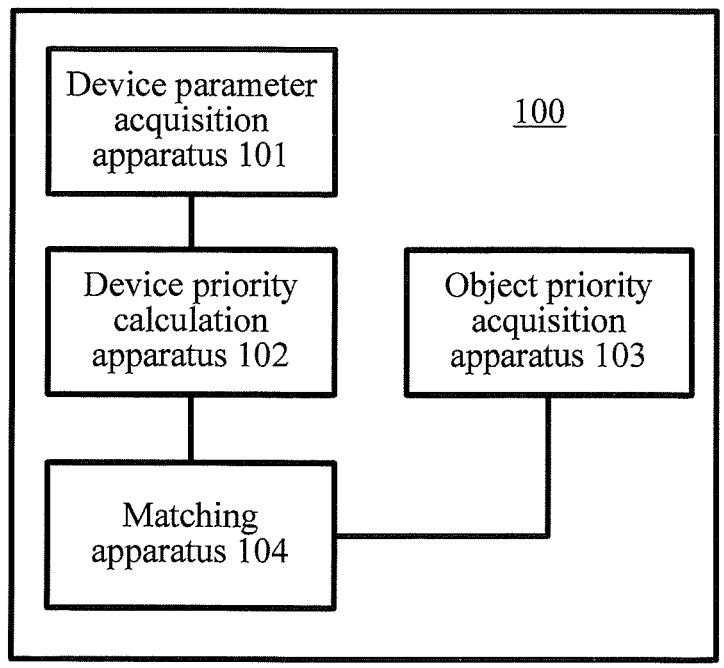
FIG. 3 is a schematic block diagram of a system for configuring a storage device in a hybrid storage environment according to an embodiment of the present invention.

FIG. 3 is a schematic block diagram of a system for configuring a storage device in a hybrid storage environment according to an embodiment of the present invention. As shown in FIG. 3, a system 100 for configuring a storage device in a hybrid storage environment according to an embodiment of the present invention includes: a device parameter acquisition apparatus 101, configured to acquire a plurality of attribute parameters of each storage device in a plurality of storage devices; a device priority calculation apparatus 102, connected to the device parameter acquisition apparatus 101, and configured to perform calculation according to the attribute parameters to obtain a priority of each storage device; an object priority acquisition apparatus 103, configured to acquire a storage priority of each data object; and a matching apparatus 104, connected to the device priority calculation apparatus 102 and the object priority acquisition apparatus 103, and configured to perform matching according to the storage priority of each data object and the priority of each storage device, so as to store each data object into a storage device with a priority corresponding to the storage priority of the data object.

By using the system for configuring a storage device in a hybrid storage environment, automatic configuration of a plurality of storage devices and a plurality of data objects in a hybrid storage environment can be implemented, which avoids manual involvement, thereby reducing security risks, improving performance of the system, and reducing energy consumption of the system.

The system for configuring a storage device in a hybrid storage environment according to this embodiment of the present invention is described in detail in the following by using an example in which a stored data object is a database object in a database system.

Figure 4:
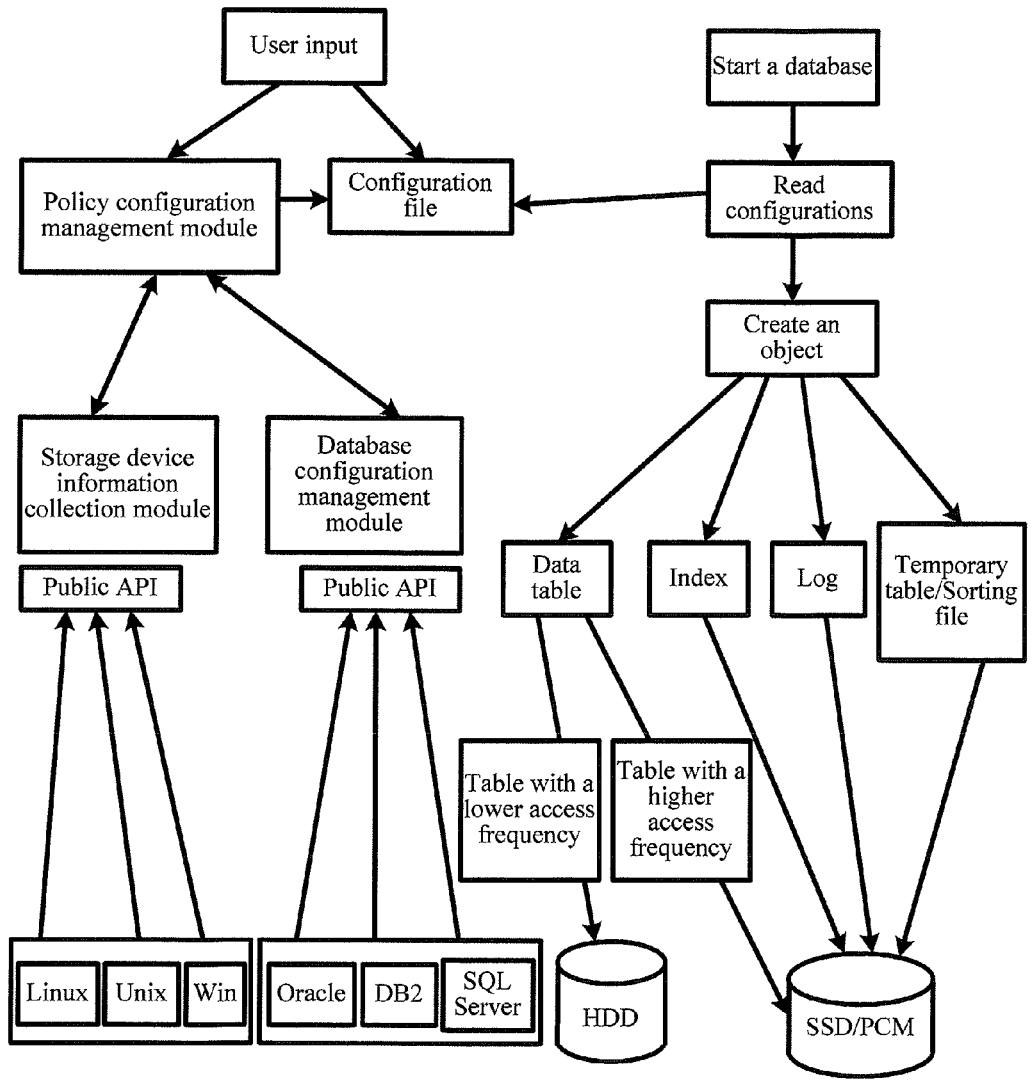
FIG. 4 is a schematic structural diagram of a system for configuring a storage device for a database object in a hybrid storage environment according to an embodiment of the present invention.

FIG. 4 is a schematic structural diagram of a system for configuring a storage device for a database object in a hybrid storage environment according to an embodiment of the present invention. As shown in FIG. 4, the system according to this embodiment of the present invention may be divided into three parts: a policy configuration management module, a storage device information collection module, and a database configuration management module. The policy configuration management module corresponds to the device priority calculation apparatus, the object priority acquisition apparatus, and the matching apparatus, and is mainly responsible for determining priorities of different storage devices, and determining, according to priorities of objects in a database object list specified by a DBA, configurations of the storage devices. The storage device information collection module corresponds to the device parameter acquisition apparatus, and is responsible for collecting data in various dimensions of a storage device abstraction model in different operating systems, and the module can provide a unified interface for logic in upper layers to read data, so as to implement a loose coupling between extensions of storage devices in different operating systems and the policy configuration management module. The database configuration management module is responsible for writing storage device options obtained after matching the objects in the database object list into different database systems, and the unified interface implements a loose coupling between writing logic in upper layers and extensions supporting different database systems. Here, by providing an abstract unified interface, the storage device information collection module and the database configuration management module mask differences between access interfaces of related objects in various types of operating systems and database systems for an external access module, thereby improving maintainability of the system.

As described above, to acquire a plurality of attribute parameters of each storage device and perform calculation according to the plurality of attribute parameters to obtain a comprehensive priority of each storage device, in this embodiment of the present invention, a storage device abstraction model M is provided:

$M=\{$Capacity, Latency, Bandwidth, Cost, Energy, Size$\}$

The model includes six dimensions: capacity (Capacity), latency (Latency), bandwidth (Bandwidth), cost (Cost), energy consumption (Energy), and size (Size). The system for configuring a storage device according to this embodiment of the present invention assesses a storage device according to these six dimensions.

In addition, based on the storage device abstraction model M, in the system according to this embodiment of the present invention, a provided default calculation formula based on attribute parameters of a storage device is:

$$p = \frac{(a_1 \times \text{Capacity} + a_2 \times \text{Bandwidth})}{a_3 \times \text{Latency} + a_4 \times \text{Cost} + a_5 \times \text{Energy} + a_6 \times \text{Size}} \quad \text{Formula (1)}$$

where $\alpha_1$ to $\alpha_6$ are influencing factors, each of which is greater than or equal to 0 and less than 1, and in this embodiment of the present invention, a DBA may set the values of the influencing factors according to requirements.

Here, a person skilled in the art may understand that the storage device abstraction model M and calculation formula (1) are merely exemplary, and other attribute parameters may also be selected to form corresponding calculation formulas according to different requirements. For example, when some hybrid storage environments are insensitive to cost, the provided storage device abstraction model may include only five dimensions: capacity, latency, bandwidth, energy consumption, and size. Alternatively, when being insensitive to both cost and size, the provided storage device abstraction model may include only four dimensions: capacity, latency, bandwidth, and energy consumption. In this case, a calculation formula such as formula (1) may still be adopted to calculate a comprehensive priority score of each storage device, where, for example, $\alpha_4$ or $\alpha_4$ and $\alpha_6$ are set to zero, and other calculation formulas may also be adopted for calculation.

In addition, in a case in which a stored data object is a database object, a database object set DO is provided according to the system of this embodiment of the present invention:

$$DO=\{\text{TableSpace, Table, Index, Log, TempData}\}$$

The database object set includes five types of database objects: tablespace (TableSpace), table (Table), index (Index), log (Log), and temporary data (TempData). A policy maker may set storage priorities for these database objects according to characteristics of each type of database object. For example, access frequencies of an index and a log are usually higher, and therefore higher priorities are set for the index and the log; access frequencies of a table and temporary data are usually lower, and therefore lower priorities are set for the table and the temporary data, and so on.

In the system according to the embodiment of the present invention, the influencing factors in the calculation formula and the priorities of the database objects in the DO may be set by a DBA of the system, and the system acquires the attribute parameter values of abstraction models of all the storage devices, calculates comprehensive scores according to the formula (1), and obtains priorities of the storage devices according to the scores. For example, a greater score indicates a higher priority of a storage device. Then, the system performs matching according to the priorities of the storage devices and the priorities of the objects in the DO, obtains storage device configurations of the objects, and writes the configurations into configuration files of a database system.

Among the attribute parameters of a storage device, capacity and bandwidth may be provided by an operating system, and the device parameter acquisition apparatus according to the embodiment of the present invention may obtain the capacity and bandwidth of the storage device directly from the operating system. In addition, cost, energy consumption, and size are market information of the storage device, and may be obtained by referring to a manual of the storage device, and in the system according to this embodiment of the present invention, the information may be stored in advance, for example, in a list, in the device parameter acquisition apparatus.

For latency of the storage device, the operating system sometimes may fail to provide access latency data of an accessed storage device. In this case, the system according to this embodiment of the present invention may have an active detection mechanism, where the parameter acquisition apparatus performs random and sequential reading and writing on the storage device for a plurality of times to calculate an average access latency.

Specifically, the system according to this embodiment of the present invention provides the active detection mechanism for an access latency of a storage device. When the operating system does not provide the access latency of the storage device, the system can actively write data to the storage device and then perform random and sequential reading and writing on the data for a plurality of times, so as to calculate an average access latency, thereby obtaining the access latency of the storage device. For example, one implementation method is as follows: writing 4 k, 8 k, 256 k, 1M, and 10M text files and binary files to the storage device, performing an operation of sequential and random reading on the files of different sizes, recording access time, and finally arithmetically averaging the access time to obtain empirical data of the access latency of the storage device.

In the system for configuring a storage device in a hybrid storage environment according to this embodiment of the present invention, attribute parameter information of a plurality of storage devices deployed in different operating systems may be acquired. In addition, in a case in which access latency information cannot be obtained, the system supports active detection of an access latency of a storage device, so that the system can comprehensively know related attribute parameters of all the storage devices, thereby improving accuracy of automatic matching.

In addition, a user may perform setting on a configuration algorithm, a selection range of storage devices, an influencing factor, and the like according to requirements, thereby improving the use flexibility for the user and satisfying various requirements.

Figure 5:
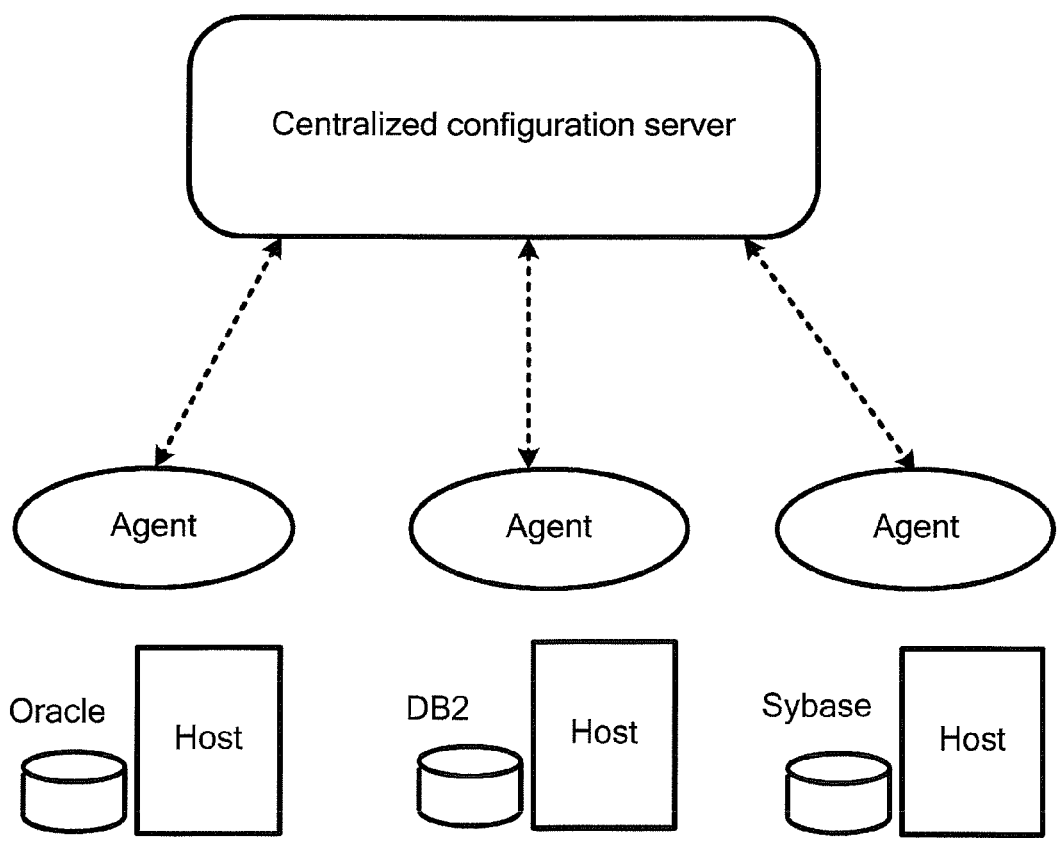
FIG. 5 is a schematic diagram of deployment of a distributed system.

In addition, in the system for configuring a storage device in a hybrid storage environment according to this embodiment of the present invention, sharing of a same configuration policy by different hosts may be implemented by using a distributed agent, which is quite effective for configuration and management of database systems on a plurality of hosts in a data center. From the perspective of function, an agent has functions of the storage device information collection module and the database configuration management module shown in FIG. 4, and a centralized configuration server has functions of the policy configuration management module. FIG. 5 is a schematic diagram of deployment of a distributed system.

By using a distributed agent to implement sharing of a same configuration policy by different hosts, batch deployment of configurations can be supported, thereby lowering skill requirements and the amount of work for a DBA, and reducing the overall maintenance cost of the system.

In addition, a plurality of database types such as Oracle, DB2, MS SQL and Sybase may exist in a data center environment. Each database may have different versions, management commands and access interfaces of databases of different types are significantly different, and even management commands and access interfaces of databases of a same type but of different versions may be different. For a DBA of a data center, managing and maintaining a database system is a demanding work. However, in this embodiment of the present invention, the system for configuring a storage device in a hybrid storage environment performs unified abstraction and centralized configuration for managing database objects, so that heterogeneity of database systems can be masked, thereby reducing the management difficulty for the DBA.

In the foregoing description, database objects in a database system are used as an example for description, but a person skilled in the art may understand that the method and system for configuring a storage device in a hybrid storage environment according to the embodiments of the present invention may also be applied to data objects in other application systems other than the database system, so as to configure different storage devices for different data objects. In the case of data objects in other application systems, a user may also set different priorities for the data objects and perform matching according to a calculated priority of each storage device. The embodiments of the present invention do not imply any limitation thereto.

By using the method and system for configuring a storage device in a hybrid storage environment according to the embodiments of the present invention, a storage device abstraction model, a method for calculating a comprehensive priority score and an automatic matching mechanism of data objects can be provided, so that automatic configuration of data objects and storage devices in a hybrid storage environment is implemented, which avoids manual involvement, thereby reducing security risks, improving performance of the system, and reducing energy consumption of the system.

In addition, by supporting a distributed deployment function, different data systems can share a same configuration policy, so that batch configuration of multiple servers in a network environment is implemented, thereby greatly reducing the amount of work for a DBA in a data center application scenario.

A person of ordinary skill in the art may be aware that, in combination with the examples described in the embodiments disclosed in this specification, units and algorithm steps may be implemented by electronic hardware, computer software or a combination thereof. In order to clearly describe the interchangeability between hardware and the software, the foregoing has generally described compositions and steps of each example according to functions. Whether the functions are executed by hardware or software depends on particular applications and design constraint conditions of the technical solutions. A person skilled in the art may use different methods to implement the described functions for each specific application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatus or units may be implemented in electrical, mechanical, or other forms.

The units described as separate parts may or may not be physically separate, and the parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated units may be implemented in a form of hardware, or may be implemented in a form of a software functional unit.

When the integrated units are implemented in a fowl of a software functional unit and sold or used as an independent product, the integrated units may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, or a network device and the like) to execute all or a part of the steps of the methods described in the embodiments of the present invention. The storage medium includes: any mediums that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed by the present invention shall fall within the protection scope of the present invention. Therefore, the protection scope of the present invention shall be subject to the protection scope of the claims.

What is claimed is:

1. A method for configuring a storage device in a hybrid storage environment, the method comprising:
acquiring a plurality of attribute parameters of each storage device in a plurality of storage devices, wherein the attribute parameters comprise at least two of the following: capacity, latency, bandwidth, cost, energy consumption, and size;
performing calculation according to the plurality of attribute parameters to obtain a priority of each storage device;
acquiring a storage priority of each data object;
performing matching according to the storage priority of each data object and the priority of each storage device, so as to store each data object into a storage device with a priority corresponding to the storage priority of the data object; and
wherein performing calculation according to the plurality of attribute parameters to obtain a priority of each storage device comprises:
calculating a comprehensive priority score of each storage device according to the following formula (1):

$$p = \frac{(a_1 \times \text{Capacity} + a_2 \times \text{Bandwidth})}{a_3 \times \text{Latency} + a_4 \times \text{Cost} + a_5 \times \text{Energy} + a_6 \times \text{Size}} \quad \text{Formula (1)}$$

wherein $\alpha_1$ to $\alpha_6$ are influencing factors set by a user, each of which is greater than or equal to 0 and less than 1, but both $\alpha_1$ and $\alpha_2$ are not equal to 0 at the same time, and $\alpha_3$, $\alpha_4$, $\alpha_5$ and $\alpha_6$ are not equal to 0 at the same time; and
determining the priority of each storage device according to the comprehensive priority score of each storage device.

2. The method according to claim 1, wherein after performing matching according to the storage priority of each data object and the priority of each storage device, the method further comprises:
generating storage device configuration information of each data object, wherein the storage device configuration information of each data object indicates which storage device the data object is stored in; and
writing the storage device configuration information of each data object into a configuration file of the data object, so as to store the data object into a storage device configured for the data object.

3. The method according to claim 1, wherein the data object is a database object in a database system, and acquiring a storage priority of each data object comprises:
establishing a database object set DO:

DO={TableSpace, Table, Index, Log,TempData} wherein the database object set DO comprises five types of database objects: table space, table, index, log, and temporary data; and the storage priority of each database object is set by a user.

4. The method according to claim 1, wherein the latency parameter of a storage device is acquired by using an active detection mechanism comprising:

performing, actively, random and sequential reading and writing on each storage device for a plurality of times to obtain access latencies of the plurality of times; and calculating an average access latency, which is used as the latency parameter of the storage device, based on the access latencies of the plurality of times.

5. The method according to claim 2, wherein by providing a unified abstract interface for different operating systems and different data object types, the plurality of attribute parameters is acquired from each storage device in the plurality of devices and the storage device configuration information of each data object is written into the configuration file of the data object.

6. A system for configuring a storage device in a hybrid storage environment, the system comprising:

a device parameter acquisition apparatus, configured to acquire a plurality of attribute parameters of each storage device in a plurality of storage devices, wherein the attribute parameters comprise at least two of the following: capacity, latency, bandwidth, cost, energy consumption, and size;

a device priority calculation apparatus, connected to the device parameter acquisition apparatus, and configured to perform calculation according to the plurality of attribute parameters to obtain a priority of each storage device;

an object priority acquisition apparatus, configured to acquire a storage priority of each data object;

a matching apparatus, connected to the device priority calculation apparatus and the object priority acquisition apparatus, and configured to perform matching according to the storage priority of each data object and the priority of each storage device, so as to store each data object into a storage device with a priority corresponding to the storage priority of the data object; and wherein the device priority calculation apparatus is configured to:

calculate a comprehensive priority score of each storage device according to the following formula (1):

$$p = \frac{(a_1 \times \text{Capacity} + a_2 \times \text{Bandwidth})}{a_3 \times \text{Latency} + a_4 \times \text{Cost} + a_5 \times \text{Energy} + a_6 \times \text{Size}} \quad \text{Formula (1)}$$

wherein $\alpha_1$ to $\alpha_6$ are influencing factors set by a user, each of which is greater than or equal to 0 and less than 1, but both $\alpha_1$ and $\alpha_2$ are not equal to 0 at the same time, and $\alpha_3$, $\alpha_4$, $\alpha_5$ and $\alpha_6$ are not equal to 0 at the same time; and determine the priority of each storage device according to the comprehensive priority score of each storage device.

7. The system according to claim 6, further comprising:

a configuration information generation apparatus, connected to the matching apparatus, and configured to generate storage device configuration information of each data object, wherein the storage device configuration information of each data object indicates which storage device the data object is stored in; and a configuration information writing apparatus, connected to the configuration information generation apparatus, and configured to write the storage device configuration information of each data object into a configuration file of the data object, so as to store the data object into a storage device configured for the data object.

8. The system according to claim 6, wherein the data object is a database object in a database system, and the object priority acquisition apparatus is specifically configured to:

establish a database object set DO:

DO={TableSpace, Table, Index, Log, TempData} wherein the database object set DO comprises five types of database objects: tablespace, table, index, log, and temporary data; and the storage priority of each database object is set by a user.

9. The system according to claim 6, wherein the device parameter acquisition apparatus comprises an active detection mechanism, configured to acquire a latency parameter of a storage device, and the active detection mechanism:

perform, actively, random and sequential reading and writing on each storage device for a plurality of times to obtain access latencies of the plurality of times; and calculate an average access latency, which is used as the latency parameter of the storage device, based on the access latencies of the plurality of times.

10. The system according to claim 7, further comprising:

a unified abstract interface for different operating systems and different data object types, connected to the device parameter acquisition apparatus and the configuration information writing apparatus, wherein the device parameter acquisition apparatus is configured to acquire, through the abstract interface, the plurality of attribute parameters from each storage device in the plurality of storage devices, and the configuration information writing apparatus is configured to write, through the abstract interface, the storage device configuration information of each data object into the configuration file of the data object.

11. A distributed system for configuring a storage device in a hybrid storage environment, the distributed system comprising:

a plurality of agents, each agent comprising:

device parameter acquisition apparatus, configured to acquire a plurality of attribute parameters of each storage device in a plurality of storage devices, wherein the attribute parameters comprise at least two of the following: capacity, latency, bandwidth, cost, energy consumption, and size; and a centralized configuration server comprising:

a device priority calculation apparatus, connected to each device parameter acquisition apparatus of each agent, and configured to perform calculation according to the plurality of attribute parameters to obtain a priority of each storage device;

an object priority acquisition apparatus, configured to acquire a storage priority of each data object;

a matching apparatus, connected to the device priority calculation apparatus and the object priority acquisition apparatus, and configured to perform matching according to the storage priority of each data object and the priority of each storage device, so as to store each data object into a storage device with a priority corresponding to the storage priority of the data object; and wherein the device priority calculation apparatus is configured to:
  calculate a comprehensive priority score of each storage device according to the following formula (1):

$$p = \frac{(a_1 \times \text{Capacity} + a_2 \times \text{Bandwidth})}{a_3 \times \text{Latency} + a_4 \times \text{Cost} + a_5 \times \text{Energy} + a_6 \times \text{Size}} \quad \text{Formula (1)}$$

wherein $\alpha_1$ to $\alpha_6$ are influencing factors set by a user, each of which is greater than or equal to 0 and less than 1, but both $\alpha_1$ and $\alpha_2$ are not equal to 0 at the same time, and $\alpha_3$, $\alpha_4$, $\alpha_5$ and $\alpha_6$ are not equal to 0 at the same time; and
  determine the priority of each storage device according to the comprehensive priority score of each storage device.

12. The system according to claim 11, wherein each agent further comprises:
  a configuration information generation apparatus, connected to the matching apparatus, and configured to generate storage device configuration information of each data object, wherein the storage device configuration information of each data object indicates which storage device the data object is stored in; and
  a data object storage apparatus, connected to the configuration information generation apparatus, and configured to write the storage device configuration information of each data object into a configuration file of the data object, so as to store the data object into a storage device configured for the data object.

13. A non-transitory computer-readable storage medium having a program recorded thereon; where the program makes a computer execute a method for configuring a storage device in a hybrid storage environment comprising:
  acquiring a plurality of attribute parameters of each storage device in a plurality of storage devices, wherein the attribute parameters comprise at least two of the following: capacity, latency, bandwidth, cost, energy consumption, and size;
  performing calculation according to the plurality of attribute parameters to obtain a priority of each storage device;
  acquiring a storage priority of each data object;
  performing matching according to the storage priority of each data object and the priority of each storage device, so as to store each data object into a storage device with a priority corresponding to the storage priority of the data object; and
  wherein performing calculation according to the plurality of attribute parameters to obtain a priority of each storage device comprises:
  calculating a comprehensive priority score of each storage device according to the following formula (1):

$$p = \frac{(a_1 \times \text{Capacity} + a_2 \times \text{Bandwidth})}{a_3 \times \text{Latency} + a_4 \times \text{Cost} + a_5 \times \text{Energy} + a_6 \times \text{Size}} \quad \text{Formula (1)}$$

wherein $\alpha_1$ to $\alpha_6$ are influencing factors set by a user, each of which is greater than or equal to 0 and less than 1, but both $\alpha_1$ and $\alpha_2$ are not equal to 0 at the same time, and $\alpha_3$, $\alpha_4$, $\alpha_5$ and $\alpha_6$ are not equal to 0 at the same time; and
  determining the priority of each storage device according to the comprehensive priority score of each storage device.

14. A computer system, comprising:
a memory; and
a processor coupled with the memory;
wherein when executed, code stored in the memory causes the processor to:
  acquire a plurality of attribute parameters of each storage device in a plurality of storage devices, wherein the attribute parameters comprise at least two of the following: capacity, latency, bandwidth, cost, energy consumption, and size;
  perform calculation according to the plurality of attribute parameters to obtain a priority of each storage device;
  acquire a storage priority of each data object;
  perform matching according to the storage priority of each data object and the priority of each storage device, so as to store each data object into a storage device with a priority corresponding to the storage priority of the data object; and
  wherein performing calculation according to the plurality of attribute parameters to obtain a priority of each storage device comprises:
  calculating a comprehensive priority score of each storage device according to the following formula (1):

$$p = \frac{(a_1 \times \text{Capacity} + a_2 \times \text{Bandwidth})}{a_3 \times \text{Latency} + a_4 \times \text{Cost} + a_5 \times \text{Energy} + a_6 \times \text{Size}} \quad \text{Formula (1)}$$

wherein $\alpha_1$ to $\alpha_6$ are influencing factors set by a user, each of which is greater than or equal to 0 and less than 1, but both $\alpha_1$ and $\alpha_2$ are not equal to 0 at the same time, and $\alpha_3$, $\alpha_4$, $\alpha_5$ and $\alpha_6$ are not equal to 0 at the same time; and
  determining the priority of each storage device according to the comprehensive priority score of each storage device.

* * * * *